US011164043B2

(12) United States Patent
Kumagai et al.

(10) Patent No.: US 11,164,043 B2
(45) Date of Patent: Nov. 2, 2021

(54) CREATING DEVICE, CREATING PROGRAM, AND CREATING METHOD

(71) Applicant: NIPPON TELEGRAPH AND TELEPHONE CORPORATION, Chiyoda-ku (JP)

(72) Inventors: Atsutoshi Kumagai, Musashino (JP); Tomoharu Iwata, Soraku-gun (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 490 days.

(21) Appl. No.: 16/093,444

(22) PCT Filed: Apr. 17, 2017

(86) PCT No.: PCT/JP2017/015486
§ 371 (c)(1),
(2) Date: Oct. 12, 2018

(87) PCT Pub. No.: WO2017/188048
PCT Pub. Date: Nov. 2, 2017

(65) Prior Publication Data
US 2019/0213445 A1  Jul. 11, 2019

(30) Foreign Application Priority Data
Apr. 28, 2016  (JP) .............................. JP2016-091693

(51) Int. Cl.
*G06K 9/62* (2006.01)
*G06N 20/00* (2019.01)
(Continued)

(52) U.S. Cl.
CPC ......... *G06K 9/6257* (2013.01); *G06K 9/6259* (2013.01); *G06N 20/00* (2019.01);
(Continued)

(58) Field of Classification Search
CPC .... G06K 9/627; G06K 9/6257; G06K 9/6259; G06N 7/005
See application file for complete search history.

(56) References Cited

U.S. PATENT DOCUMENTS

| | | | |
|---|---|---|---|
| 7,577,709 B1 * | 8/2009 | Kolcz | .................. G06K 9/6278 709/206 |
| 2003/0045951 A1 * | 3/2003 | Luk | ........................ G06N 20/00 700/86 |

(Continued)

FOREIGN PATENT DOCUMENTS

| | | |
|---|---|---|
| JP | 2011-039575 A | 2/2011 |
| JP | 2011-145951 A | 7/2011 |

OTHER PUBLICATIONS

International Search Report dated Jul. 4, 2017 in PCT/JP2017/015486 filed Apr. 17, 2017.
(Continued)

*Primary Examiner* — Peet Dhillon
(74) *Attorney, Agent, or Firm* — Oblon, McClelland, Maier & Neustadt, L.L.P.

(57) ABSTRACT

To create a classifier whose classification accuracy is maintained in consideration of temporal changes in a generation distribution of a sample and a new feature that has not appeared in learning data, a classifier is created in which a feature correlation learning unit learns a correlation between a feature of a sample of labeled learning data, and a feature appearing only in a sample of unlabeled learning data, and a classifier creating unit adds the feature appearing only in the sample of the unlabeled learning data to the feature of the sample of the labeled learning data by using the correlation, and outputs a label associated with an input sample by using the sample of the labeled learning data to which the feature appearing only in the sample of the unlabeled learning data is added.

6 Claims, 9 Drawing Sheets

(51) Int. Cl.
*G06N 20/10* (2019.01)
*G06N 20/20* (2019.01)
*G06N 7/00* (2006.01)

(52) U.S. Cl.
CPC ............. *G06N 20/10* (2019.01); *G06N 7/005* (2013.01); *G06N 20/20* (2019.01)

(56) References Cited

U.S. PATENT DOCUMENTS

| | | | | |
|---|---|---|---|---|
| 2010/0217732 A1* | 8/2010 | Yang | ................... | G06N 20/00 706/21 |
| 2013/0097103 A1* | 4/2013 | Chari | ................... | G06N 20/00 706/12 |
| 2013/0254153 A1 | 9/2013 | Marcheret | | |
| 2015/0206066 A1* | 7/2015 | Abu-Mostafa | ....... | G06K 9/6223 706/12 |
| 2016/0155063 A1* | 6/2016 | Rich | ................... | G06N 5/022 706/12 |
| 2016/0162802 A1* | 6/2016 | Chickering | ............ | G06N 20/00 706/12 |

OTHER PUBLICATIONS

Masaki Tsukada, et al., "Yuganda Moji no Ninshiki to Jido Label-zuke," IEICE Technical Report, vol. 111, No. 317, Nov. 17, 2011, 8 Pages.

Yves Grandvalet, et al., "Semi-supervised Learning by Entropy Minimization," In Advances in Newral Information Processing Systems, 2004, 8 Pages.

Hidetoshi Shimodaira, "Improving predictive inference under covariate shift by weighting the log-likelihood function," Journal of Statistical Planning and Inference, vol. 90, 2000, pp. 227-244.

Decision to Grant dated May 28, 2019 in Japanese Patent Application No. 2018-514508 (with English translation), 3 pages.

* cited by examiner

FIG.2

Given:

LABELED LEARNING DATA $Y_1$="SOCCER" $X_{o,1}$=(SHOOT, HONDA)
$Y_2$="SOCCER" $X_{o,2}$=(LEFT-HANDED, ACE)
$Y_3$="BASEBALL" $X_{o,3}$=(SHOOT, RAKUTEN)
$Y_4$="BASEBALL" $X_{o,4}$=(TANAKA, ACE)
...

UNLABELED LEARNING DATA $X_{N+1}$=($X_{o,N+1}, X_{h,N+1}$)=(SHOOT, HONDA, FOOTBALL, AD MILAN)
$X_{N+2}$=($X_{o,N+2}, X_{h,N+2}$)=(LEFT-HANDED, MET, BARCELONA)
$X_{N+3}$=($X_{o,N+3}, X_{h,N+3}$)=(RAKUTEN, IWAKUMA, PITCHER)
$X_{N+4}$=($X_{o,N+4}, X_{h,N+4}$)=(TANAKA, PITCHER, MAJOR LEAGUE)
...

- $X_{o,n}$: FEATURE VECTOR OF SAMPLE n OF LABELED LEARNING DATA
- $Y_n$: LABEL OF SAMPLE n OF LABELED LEARNING DATA
- $X_{N+m}$=($X_{o,N+m}, X_{h,N+m}$): FEATURE VECTOR OF SAMPLE m OF UNLABELED LEARNING DATA
- $X_{o,k}$: FEATURE HAVING APPEARED IN LABELED LEARNING DATA
- $X_{h,k}$: FEATURE APPEARING ONLY IN UNLABELED LEARNING DATA

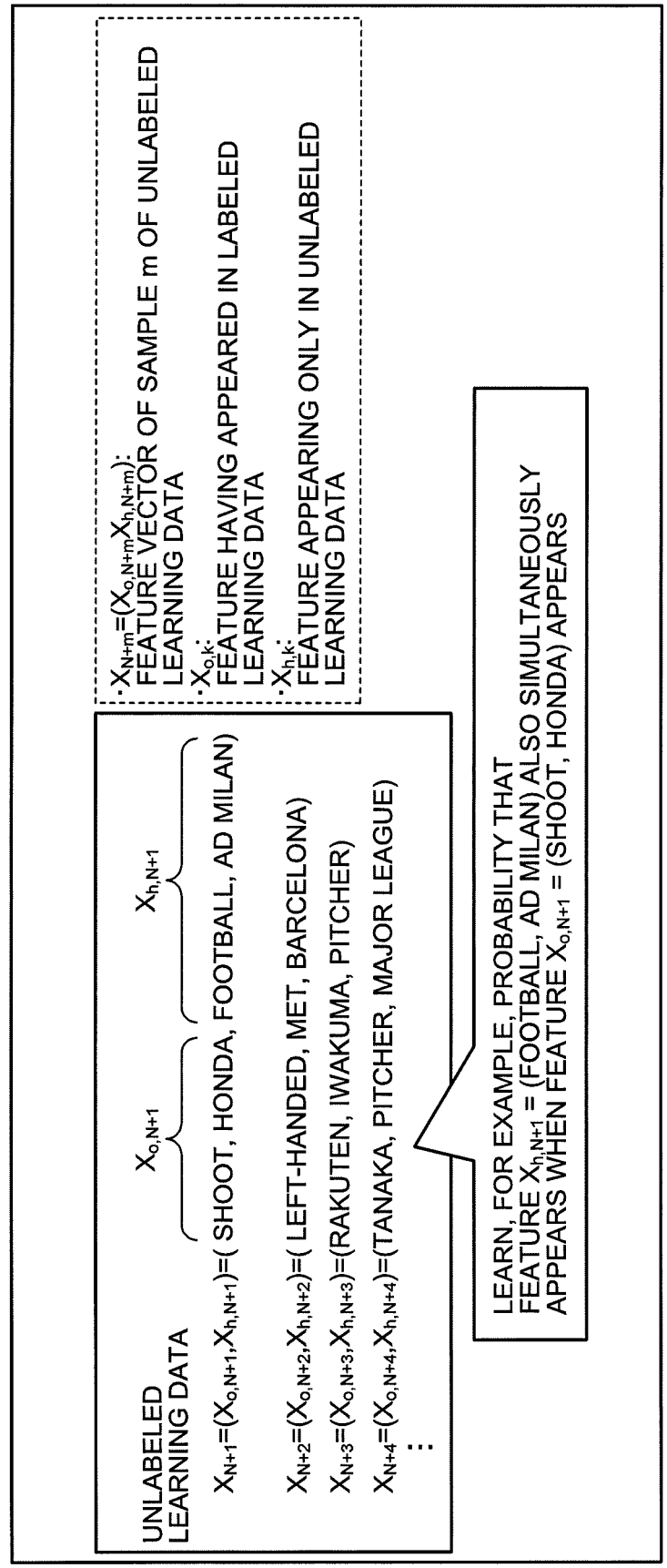

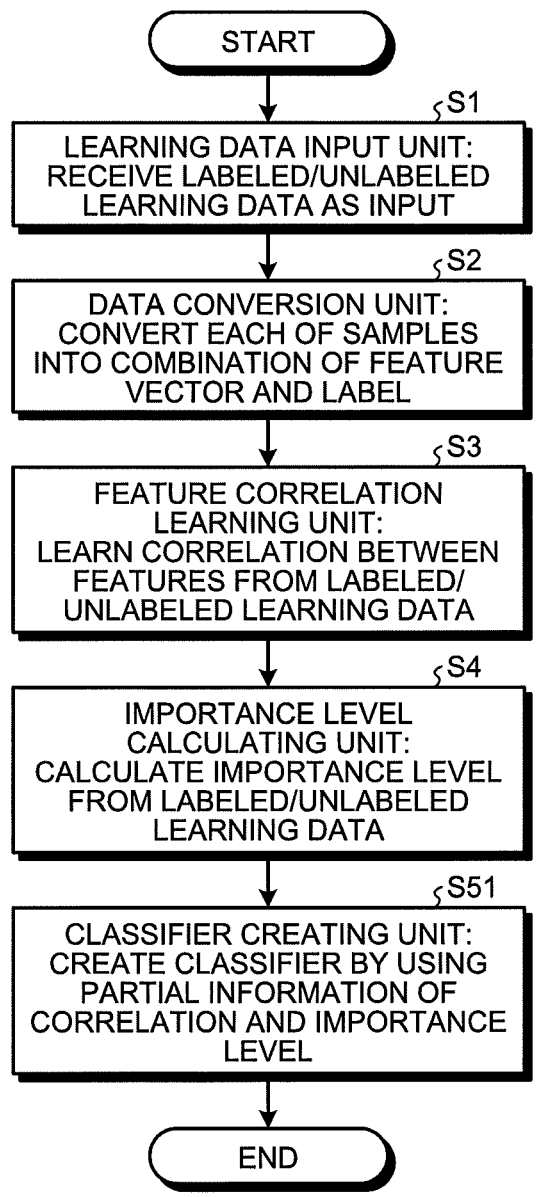

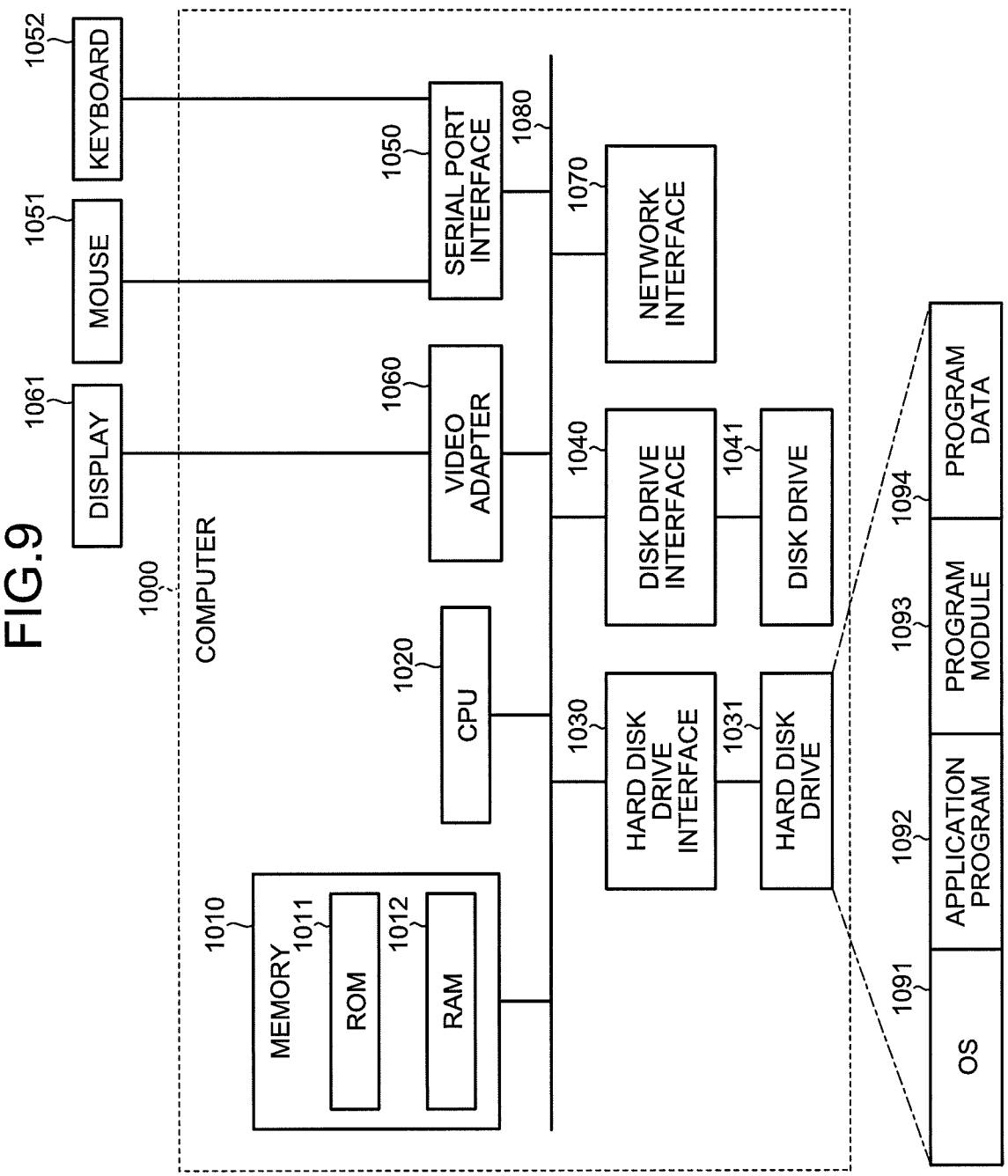

CREATING DEVICE, CREATING PROGRAM, AND CREATING METHOD

FIELD

The present invention relates to a creating device, a creating program, and a creating method.

BACKGROUND

In machine learning, classifiers that output a label representing an attribute of a sample when the sample is input are known. For example, when a newspaper article is input to a classifier as a sample, a label such as politics, economics, and sports is output. Creation, in other word, learning of a classifier is performed by using labeled learning data, which is a set of combinations of a sample for learning and a label of the sample. That is, the labeled learning data is expressed as {(sample 1, label 1), (sample 2, label 2) . . . }.

Note that, a set of samples to which labels are not given is hereinafter referred to as unlabeled learning data. In addition, labeled learning data and unlabeled learning data are collectively referred to as learning data.

Classification criteria of classifiers may change over time. For example, creators of spam mails consistently create spam mails having new features to enable the spam mails to pass through spam filters, which are classifiers against spam mails. Consequently, classification criteria for spam mails change over time, and the classification accuracy of a classifier is remarkably lowered.

The following two factors are considered to mainly cause temporal deterioration of the classification accuracy of a classifier. The first main factor is that a feature that has not appeared in learning data may appear over time. For example, when a spam mail is classified as a sample, the sample is generally converted into a set of words while words appearing in the mail are defined as features. A classifier is created by using words, and thus, in this case, words that have not appeared in learning data cannot be used for classification by the classifier. Therefore, if such new features that have not appeared in learning data increase, a classifier has difficulty in correctly classifying a sample to be input.

The second main factor of temporal deterioration of the classification accuracy of a classifier is that a generation distribution of a sample may change over time. Here, the generation distribution of a sample means a description of the probabilities that samples can occur (hereinafter referred to as the generation probabilities). For example, the generation probability of a sample can change from 0.3 at a learning time to 0.5 at a test time of a created classifier. A classifier learns based on a generation distribution of learning data. Consequently, if the generation distributions of a sample at a learning time and at a test time differ, correct classification of the sample is difficult.

In order to address such temporal deterioration of the classification accuracy of a classifier, a technique for causing the classifier to relearn, that is, creating the classifier with updated classification criteria is disclosed. The technique uses unlabeled learning data, which can be collected at low cost, in addition to labeled learning data (See Non-Patent Literatures 1 and 2).

CITATION LIST

Non Patent Literature

Non Patent Literature 1: Y. Grandvalet and Y. Bengio, "Semi-supervised Learning by Entropy Minimization", In Advances in Newral Information Processing Systems, 2004, p. 529-536

Non Patent Literature 2: H. Shimodaira, "Improving predictive inference under covariate shift by weighting the log-likelihood function", Journal of Statistical Planning and Inference 90 (2000), 2000, p. 227-244

SUMMARY

Technical Problem

Unfortunately, the technique disclosed in Non-Patent Literature 1 does not consider temporal changes in a generation distribution of a sample. In contrast, although the technique disclosed in Non-Patent Literature 2 considers temporal changes in a generation distribution of a sample, the technique does not consider a feature that has not appeared in labeled learning data.

The invention is made in light of the above-described problems, and an object thereof is to create a classifier whose classification accuracy is maintained in consideration of temporal changes in a generation distribution of a sample and a new feature that has not appeared in learning data.

Solution to Problem

A creating device for creating a classifier that outputs a label representing an attribute of a sample, comprising: a learning unit that learns a correlation between a feature of a labeled sample to which the label is given, and a feature appearing only in an unlabeled sample to which the label is not given; and a creating unit that adds the feature appearing only in the unlabeled sample to the feature of the labeled sample by using the correlation, and creates a classifier that outputs a label associated with an input sample by using the labeled sample to which the feature appearing only in the unlabeled sample is added.

Advantageous Effects of Invention

According to the invention, a classifier whose classification accuracy is maintained can be created in consideration of temporal changes in a generation distribution of a sample and a new feature that has not appeared in learning data.

BRIEF DESCRIPTION OF DRAWINGS

FIG. 2 is an explanatory diagram for illustrating a correlation between features in the first embodiment.

FIG. 3 is an explanatory diagram for illustrating the correlation between features in the first embodiment.

FIG. 8 is a flowchart illustrating a creating processing procedure in a second embodiment.

FIG. 9 is a diagram illustrating a computer that executes a creating program.

DESCRIPTION OF EMBODIMENTS

First Embodiment

Figure 1:
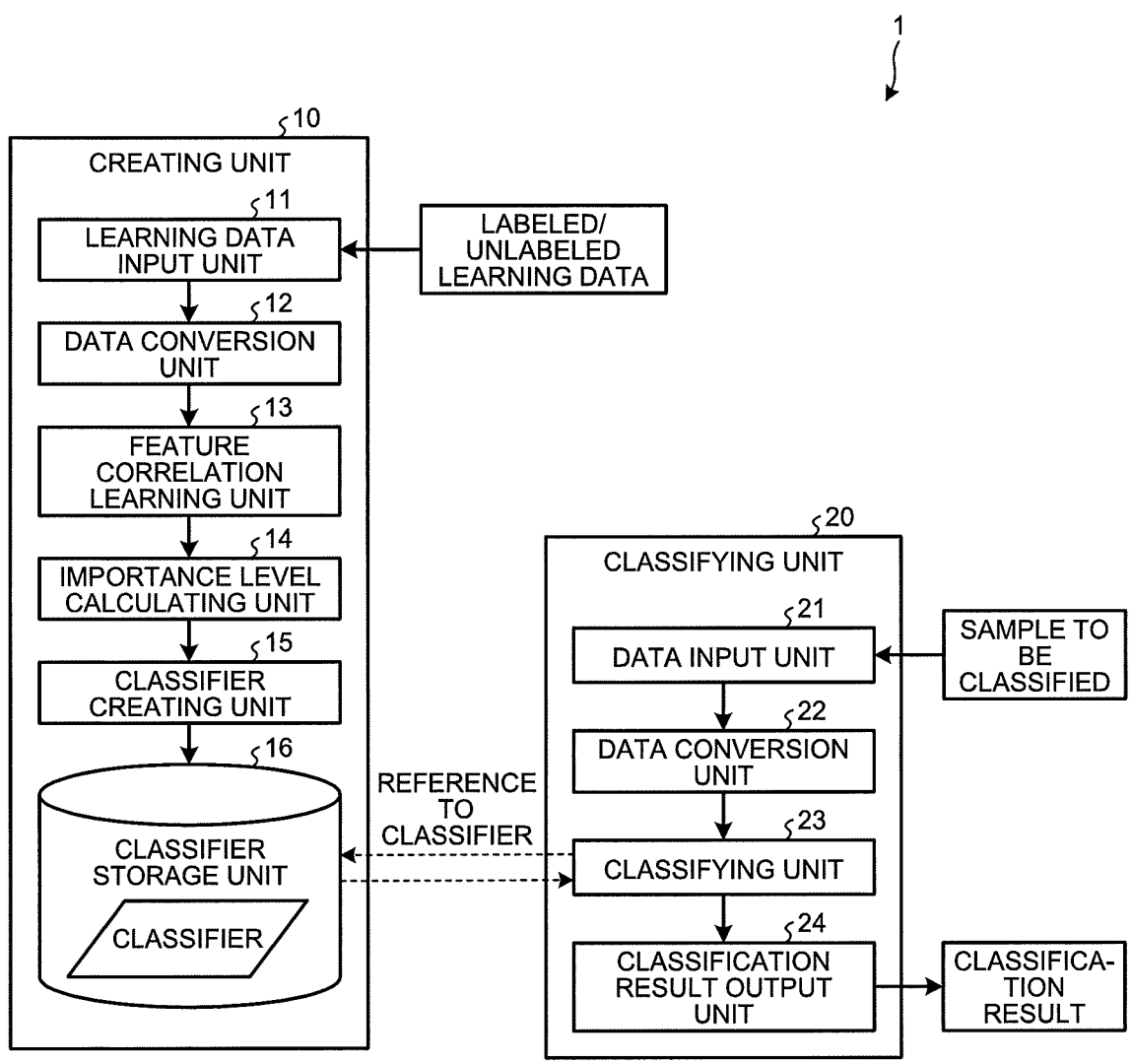
FIG. 1 is a schematic diagram illustrating a schematic configuration of a creating device according to a first embodiment.

One embodiment of the invention will now be described in detail with reference to the drawings. Note that the embodiment does not limit the invention. Furthermore, the same signs are attached to the same parts in the drawings.

Configuration of Creating Device

First, with reference to FIG. 1, a schematic configuration of a creating device according to the embodiment will be described. A creating device 1 according to the embodiment is implemented by a general-purpose computer such as a workstation and a personal computer. The creating device 1 executes later-described creating processing and creates a classifier that outputs a label representing an attribute of input data.

Note that, as illustrated in FIG. 1, the creating device 1 of the embodiment has a creating unit 10 and a classifying unit 20. The creating unit 10 performs creating processing. The classifying unit 20 performs classifying processing. The classifying unit 20 performs classifying processing of classifying an input sample with the classifier created by the creating unit 10 and outputting a label. The classifying unit 20 may be mounted in the same hardware as the creating unit 10, or may be mounted in different hardware.

Creating Unit

The creating unit 10 includes a learning data input unit 11, a data conversion unit 12, a feature correlation learning unit 13, an importance level calculating unit 14, a classifier creating unit 15, and a classifier storage unit 16.

The learning data input unit 11 is implemented by an input device such as a keyboard and a mouse, and inputs various pieces of instruction information to a later-described control unit in response to an input operation by an operator. In the embodiment, the learning data input unit 11 receives learning data used for creating processing, that is, labeled learning data and unlabeled learning data.

Here, the labeled learning data means a set of combinations of a sample and a label of the sample. For example, if the sample is text, each piece of text is given a label representing contents of the text such as politics, economy, and sport. In contrast, the unlabeled learning data means a set of samples to which labels are not given. For example, if the sample is text, the unlabeled learning data is represented by a set of text. In the embodiment, this unlabeled learning data is defined as new learning data collected after the labeled learning data.

Note that the labeled learning data and the unlabeled learning data may be input from a device such as an external server device to the creating unit 10 via a communication control unit (not illustrated) implemented by, for example, a network interface card (NIC).

The control unit is implemented by, for example, a central processing unit (CPU) that executes a processing program, and functions as the data conversion unit 12, the feature correlation learning unit 13, the importance level calculating unit 14, and the classifier creating unit 15.

The data conversion unit 12 converts each of samples of the received labeled learning data into combined data of a feature vector and a numerical label as preparation for the later-described processing in the feature correlation learning unit 13 and the importance level calculating unit 14. Similarly, the data conversion unit 12 converts each of samples of the received unlabeled learning data into data of a feature vector. The labeled learning data or the unlabeled learning data in the processing of the creating unit 10 below means the data after conversion with the data conversion unit 12.

Here, the numerical label is obtained by converting a label, which is given to each of the samples of the labeled learning data, into a numerical value. In addition, the feature vector is a representation of a feature of each of the received samples by an n-dimensional number vector, and is converted by a general-purpose approach in machine learning. For example, if the sample is text, the conversion is performed by morphological analysis, n-gram, or delimiters.

The feature correlation learning unit 13 functions as a learning unit. That is, the feature correlation learning unit 13 learns a correlation between the feature of the sample of the labeled learning data and the feature appearing only in the sample of the unlabeled learning data.

The correlation between the features will now be described with reference to FIGS. 2 to 4. First, a case where labeled learning data and unlabeled learning data illustrated in FIG. 2 are input will be described. In the example illustrated in FIG. 2, for example, a label $Y_1$="soccer" is given to a feature vector $X_{o,1}$=(shoot, Honda) of the first sample among N samples of the labeled learning data. Here, $X_{o,n}$ means a feature vector of the n-th sample of the labeled learning data.

In addition, FIG. 2 illustrates a feature vector $X_{N+1}$=$(X_{o,N+1}, X_{h,N+1})$=(shoot, Honda, football, AD Milan) of the first sample of the unlabeled learning data, which is collected after the labeled learning data including the N samples. Here, $X_{N+m}$ means a feature vector of the m-th sample of the unlabeled learning data. In addition, $X_{o,N+m}$ means a feature that has appeared in the labeled learning data among the feature vector of the m-th sample of the unlabeled learning data. Furthermore, $X_{h,N+m}$ means a feature appearing only in the unlabeled learning data among the feature vector of the m-th sample of the unlabeled learning data.

In this case, as illustrated in FIG. 3, the feature correlation learning unit 13 learns a correlation between the feature $X_{o,N+m}$, appearing also in the labeled learning data and the feature $X_{h,N+m}$ appearing only in the unlabeled learning data by using the unlabeled learning data. For example, FIG. 3 illustrates that the feature correlation learning unit 13 learns the correlation between the feature $X_{o,N+1}$ appearing also in the labeled learning data and the feature $X_{h,N+1}$ appearing only in the unlabeled learning data, among the feature vector $X_{N+1}$ of the first sample of the unlabeled learning data. That is, the feature correlation learning unit 13 learns the probability that, when the feature $X_{o,N+1}$=(shoot, Honda) appearing in the labeled learning data appears, the feature $X_{h,N+1}$=(football, AD Milan) appearing only in the unlabeled learning data simultaneously appears in the same sample.

Figure 4:
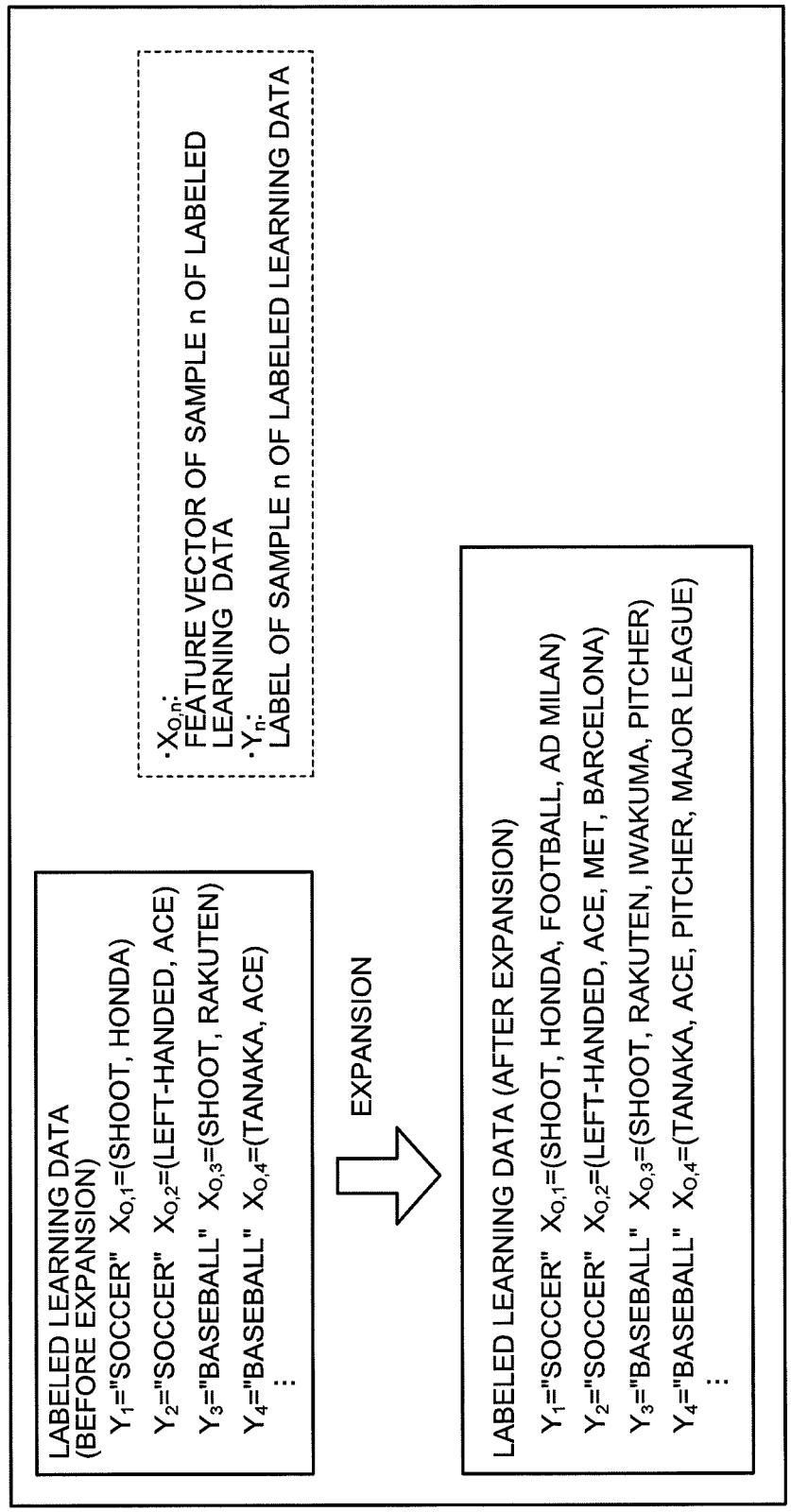
FIG. 4 is an explanatory diagram for illustrating the correlation between features in the first embodiment.

Then, as illustrated in FIG. 4, the later-described classifier creating unit 15 adds the feature appearing only in the sample of the unlabeled learning data to the feature $X_{o,n}$ of the sample of the labeled learning data by using the learned correlation. In the example illustrated in FIG. 4, the feature (football, AD Milan) appearing only in the sample of the unlabeled learning data, which is correlated with the feature vector $X_{o,1}$=(Shoot, Honda) of the first sample of the labeled learning data, is added to the feature vector $X_{o,1}$. In this way, the classifier creating unit 15 expands the feature of the labeled learning data.

Note that a model of correlation is not particularly limited, and, for example, the Gaussian distribution and the Gaussian mixture distribution are applied.

FIG. 1 will be described back again. The importance level calculating unit 14 functions as a calculating unit. That is, the importance level calculating unit 14 calculates the importance level of the sample of the labeled learning data in a generation distribution at a test time. The importance level indicates an influence level of the sample of the labeled learning data on creation of the classifier.

Figure 5:
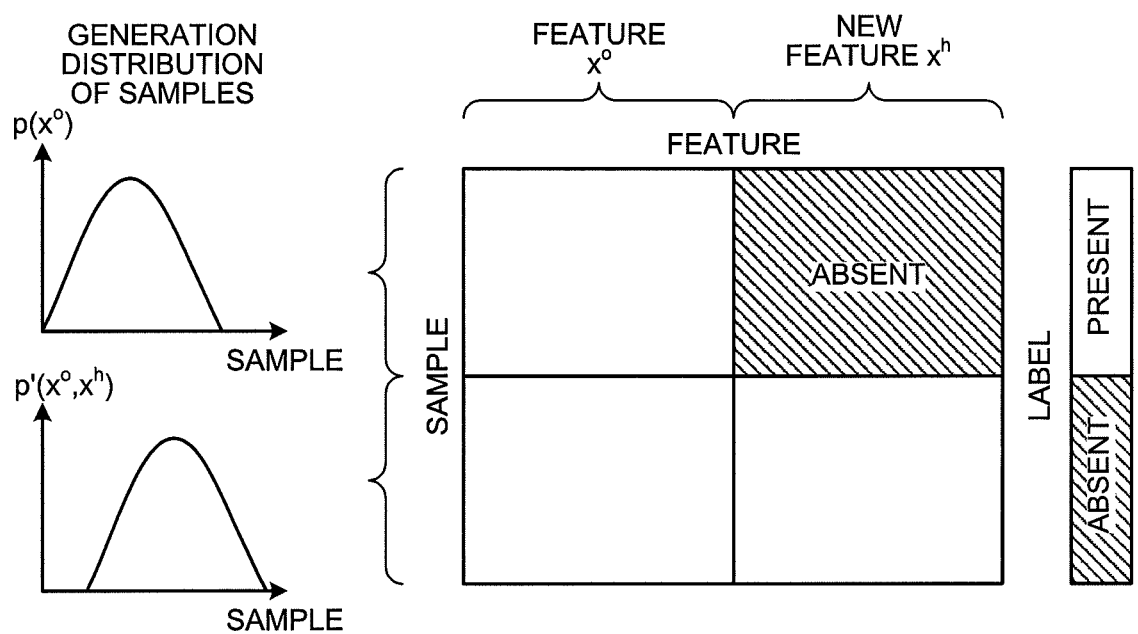
FIG. 5 is an explanatory diagram for illustrating a generation distribution of a sample in the first embodiment.

With reference to FIG. 5, the probability that a sample occurs will now be described. FIG. 5 is an explanatory diagram for describing a generation distribution of samples. As described above, the generation distribution of samples means the distribution of the probability that each of the samples occurs. In FIG. 5, a generation distribution of samples of labeled learning data is represented by a training distribution $p(x^o)$. In addition, a generation distribution of samples of unlabeled learning data is represented by a test distribution $p'(x^o, x^h)$. Here, $x^o$ represents a feature which appears not only in the labeled learning data but also in the unlabeled learning data. Furthermore, $x^h$ represents a new feature appearing only in the unlabeled learning data, which is collected after the labeled learning data. As illustrated in FIG. 5, generation distributions of samples may change over time, and the generation distribution of the samples of the labeled learning data and the generation distribution of the samples of the unlabeled learning data, which are collected after the samples of the labeled learning data, are different.

Then, the importance level calculating unit 14 calculates an importance level $\tau(x^o) = p'(x^o)/p(x^o)$. The importance level represents an influence of a sample of the labeled learning data on later-described creation of the classifier with the classifier creating unit 15.

FIG. 1 will be described back again. The classifier creating unit 15 functions as a creating unit. That is, the classifier creating unit 15 adds the feature appearing only in the sample of the unlabeled learning data to the feature of the sample of the labeled learning data by using the learned correlation. The classifier creating unit 15 also creates the classifier, which outputs a label associated with an input sample by using a sample of labeled learning data to which a feature appearing only in a sample of unlabeled learning data is added. In the embodiment, the classifier creating unit 15 also creates the classifier that outputs the label associated with the input sample by using the sample of the labeled learning data to which the feature appearing only in the sample of the unlabeled learning data is added and the importance level. Specific processing of the classifier creating unit 15 will be described later.

Note that, the embodiment employs logistic regression for a model of the classifier assuming that an event in which a certain label is to be given in the classifier occurs with a predetermined probability distribution. In addition, the model of the classifier is not limited to the logistic regression, and, for example, a support vector machine (SVM) and boosting may be employed.

The classifier storage unit 16 is implemented by a semiconductor memory device such as a random access memory (RAM) and a flash memory, or a storage such as a hard disk and an optical disk, and stores the created classifier. The storage format is not particularly limited, and examples thereof include, for example, database formats such as MySQL and PostgreSQL, table formats, and text formats.

Processing of the feature correlation learning unit 13, the importance level calculating unit 14, and the classifier creating unit 15 will now be specifically described. The embodiment employs a multivariate normal distribution for the above-described model of a correlation between features. In addition, an unconstrained least-squares importance fitting approach, which is one approach of probability density ratio estimation, is used for calculating an importance level.

First, labeled learning data D including N samples, which are collected by a certain time and input to the creating device 1, is defined as in the following expression (1). In addition, unlabeled learning data D' including M samples, which are collected after the certain time and input to the creating device 1, is defined as in the following expression (2). Note that the following expression (2) represents a new feature $x_m^h$ in the new unlabeled learning data D', which is collected after the labeled learning data.

$$D := \{x_n^o, y_n\}_{n=1}^N \qquad (1)$$

where $x_n^o$ is a $D_O$—dimensional feature vector of the n-th sample, $y_n \in \{0,1\}$ is a label of the n-th sample, and $x_n^o$ is generated from the training distribution) $p(x^o)$.

$$D' := \{(x_m^o, x_m^h)\}_{m=1}^M \qquad (2)$$

where $(x_m^o, x_m^h)$ is a $D_0 + D_h$—dimensional feature vector of the m-th sample, $(x_m^o, x_m^h)$ is generated from the test distribution $p'(x^o, x^h)$.

Here, the following expression (3) is assumed to hold between the training distribution p and the test distribution p'. That is, the generation distribution of the samples differs between for training and for testing, but a covariate shift is employed. The covariate shift assumes that the generation distribution of the labels does not change between for training and for testing under the situation where the samples are given.

$$p(x^o, x^h) \neq p'(x^o, x^h)$$

$$p(y|x^o, x^h) = p'(y|x^o, x^h) \qquad (3)$$

In the embodiment, the classifier creating unit 15 creates a classifier $Cls(x^o, x^h)$ that precisely classifies a sample $(x^o, x^h)$ generated depending on the test distribution p'. The classifier $Cls(x^o, x^h)$ minimizes a generalization error G expressed in the following expression (4).

$$G := \int loss(y, Cls(x^o, x^h)) p'(x^o, x^h, y) dx^o dx^h dy \qquad (4)$$

Here, the loss (y,y') represents any loss function defining the difference between y and y'. For example, a square error and a 0-1 loss is applied to the loss function. The square error is expressed by $(y-y')^2$. The 0-1 loss outputs 0 in the case of coincidence, or otherwise 1.

The generalization error G of the above expression (4) can be transformed as in the following expression (5).

$$\int loss(y, Cls(x^o, x^h)) \frac{p'(x^o, x^h)}{p(x^o, x^h)} p(x^o, x^h, y) dx^o dx^h dy \qquad (5)$$

Furthermore, in the embodiment, the following expression (6) is assumed to hold. That is, the probability that $x^h$ occurs in the situation where $x^o$ is given is assumed not to change between in the training distribution p and in the test distribution p'. This assumption is a key for simultaneously addressing a new feature that does not appear in the labeled learning data and an importance level.

$$p(x^h|x^o) = p'(x^h|x^o) \qquad (6)$$

With the above expression (6), the generalization error G can be transformed as in the following expression (7)

$$G \approx \frac{1}{N} \sum_n \tau(x_n^o) \int \text{loss}(y_n, Cls(x_n^o, x_n^h)) p(x_n^h | x_n^o) dx_n^h \qquad (7)$$

Here, $\tau(x^o)$ means an importance level, and as described above, is defined as in the following expression (8). Note that the importance level $\tau$ depends only on $x^o$, and not on the new feature $x^h$.

$$\tau(x^o) := \frac{p'(x^o)}{p(x^o)} \qquad (8)$$

The above expression (7) has a form in which the new feature $X^h$ is incorporated into the generalization error described in Non-Patent Literature 2, and is an extension of the generalization error described in Non-Patent Literature 2. Consequently, a classifier can be created with the added new feature $x^h$ in the framework proposed in Non-Patent Literature 2 for addressing changes in a generation distribution of samples. That is, the assumption that the above expression (6) holds enables a new feature that does not appear in labeled learning data and an importance level to be simultaneously addressed.

First, the correlation $p(x^h|x^o)$ between features is learned as follows. When a multivariate normal distribution is applied to a model of the correlation between the features, the following expression (9) holds.

$$p(x_n^h|x_n^o) = N(x_n^h|Ax_n^o + a, \Lambda^{-1}) \qquad (9)$$

where $N(\mu, \Sigma)$ is a normal distribution of an average $\mu$ and a covariance matrix E, $A \in R^{D_h \times D_0}$ is a $D_h \times D_0$-th order matrix, $a \in R^{D_h}$ is a bias term, and $\Lambda$ is $D_h$-th order matrix (precision matrix).

In this case, the feature correlation learning unit 13 learns the correlation between the features by estimating A, a, and $\Lambda$ A from the learning data.

In the embodiment, A is assumed to be a low rank matrix. That is, A can be decomposed as in the following expressions (10) with a certain positive natural number K.

$$A = BC, B \in R^{D_h \times K}, C \in R^{K \times D_0} \qquad (10)$$

Here, selection of k that is small enough can reduce the number of parameters to be estimated. For the sake of simplicity, A is assumed to be given by the following expression (11).

$$\Lambda = \text{diag}(\lambda)^2 + \varepsilon I_{D_h} \qquad (11)$$

where $\lambda$ is a $D_h$—dimensional vector, $\varepsilon$ is a positive constant, and I is a unit matrix.

These parameters B, C, a, and $\lambda$ can be determined by maximum a posteriori estimation (MAP estimation). Specifically, the parameters B, C, a, and $\lambda$ can be obtained as points that maximize the objective function F expressed by the following expression (12). Here, e and b are parameters of the probability distribution $p(\lambda^2)$ of $\lambda^2$, and $p(\lambda^2) = \text{Gam}(\lambda^2|e,b)$ holds.

Expression 12

$$F = \log p(D' | B, C, a, \lambda) + \log p(B) + \log p(C) + \log p(\lambda^2) \qquad (12)$$

$$= -\frac{1}{2} \sum_m (x_m^h - BCx_m^o - a)^T \Lambda (x_m^h - BCx_m^o - a) -$$

$$\frac{r}{2} Tr(B^T B) - \frac{r}{2} Tr(C^T C) + \frac{1}{2} \log \det(\Lambda) +$$

$$\sum_k 2(e - 1) \log \lambda_k - b\lambda_k^2 + const,$$

The numerical values of the points that maximize the objective function F expressed by the above expression (12) are obtained by, for example, a quasi-Newton method. Note that the following expression (13) represents information on differential of the objective function F. The information is needed in application of the quasi-Newton method.

$$\begin{aligned}
\frac{\partial F}{\partial B} &= \sum_m \Lambda(x_m^h - BCx_m^o - a)(Cx_m^o)^T - rB, \\
\frac{\partial F}{\partial C} &= \sum_m B^T \Lambda(x_m^h - BCx_m^o - a)(x_m^o)^T - rC, \\
\frac{\partial F}{\partial a} &= \sum_m \Lambda(x_m^h - BCx_m^o - a), \\
\frac{\partial F}{\partial \lambda} &= \sum_m -(x_m^h - BCx_m^o - a)^T \text{diag}(\lambda)(x_m^h - BCx_m^o - a) + \\
&\quad \Lambda^{-1}\lambda + 2(e-1)\lambda^{-1} - 2b\lambda,
\end{aligned} \qquad (13)$$

where $\lambda^{-1}$ represents a $D_h$-dimensional vector $$\left(\frac{1}{\lambda_1}, \cdots, \frac{1}{\lambda_{D_h}}\right)$$

A method of calculating the importance level $\tau$ with the importance level calculating unit 14 will now be described. The importance level $\tau$ is assumed to be capable of being expressed as in the following expression (14).

$$\hat{\tau}(x^o) = \alpha^T \Psi(x^o) \qquad (14)$$

where $\alpha$ is an L-dimensional vector (parameter), and $\psi$ is a basis function.

Although the basis function is not particularly limited, the importance level $\tau$ is expressed as in the following expression (15) with a Gaussian kernel, for example.

$$\hat{\tau}(x^o) = \sum_{m=1}^M \alpha_m \exp\left(-\frac{\|x^o - x_m^o\|^2}{2\gamma^2}\right) \qquad (15)$$

where, note that $\gamma$ is a real number except 0.

In this case, the parameter α can be obtained from a solution that minimizes the objective function J expressed in the following expression (16).

Expression 16

$$J(\alpha) \approx \alpha^T H \alpha - 2\alpha^T h + \rho \|\alpha\|^2 \quad (16)$$

where $\rho$ is a positive real number.

$$H = \frac{1}{N}\sum_n \psi(x_n^o)\psi(x_n^o)^T, \quad h = \frac{1}{M}\sum_m \psi(x_m^o)$$

That is, the parameter α can be obtained as in the following expression (17) by analyzing the objective function J in the above expression (16) and determining a solution that minimizes the objective function J.

$$\hat{\alpha} = (H+\rho I)^{-1} h \quad (17)$$

The classifier creating unit 15 creates the classifier by using the correlation $p(x^h|x^o)$ between the features and the importance level τ, the correlation $p(x^h|x^o)$ and the importance level τ being determined as described above. Specifically, when $p(x^h|x^o)$ is given to a classifier modeled by logistic regression, the probability that the label y indicates 1 is expressed as in the following expression (18).

$$p(y=1|x^o, x^h, w) = \sigma(w^T(x^o, x^h)) = (1+e^{-w^T(x^o, x^h)})^{-1} \quad (18)$$

where
w(,) is a $D_0 + D_h$-dimensional vector (model parameter),
σ is a sigmoid function, and
T means transposition.

Here, in order to easily address nonlinearity of the logistic regression, an approximate expression of the following expression (19) is used.

$$\begin{aligned} p(y_n | x_n^o, x_n^h, w) &\geq \\ e^{y_n s_n} \sigma(\xi_n) \exp&\left(-\frac{s_n + \xi_n}{2} - g(\xi_n)(s_n^2 - \xi_n^2)\right) \end{aligned} \quad (19)$$

where $s_n := w^T(x_n^o, x_n^h)$, $\xi_n \in R$ $\xi_n \in R$ is a parameter (real number) that determines accuracy of approximation $$g(\xi_n) = \frac{1}{2\xi_n}\left(\sigma(\xi_n) - \frac{1}{2}\right)$$

The generalization error G with an L2 regularization term added can be approximated as in the following expression (20) with the approximate expression of the above expression (19).

$$\tilde{G} = \sum_n \tilde{\tau}(x_n^o)(\tilde{G}_0(\xi_n) + \tilde{G}_1(w_o, \xi_n) + \tilde{G}_2(w_o, w_h, \xi_n)) + \frac{1}{2}c\|w\|^2 \quad (20)$$

$$\tilde{G}_0(\xi_n) := \frac{1}{2}\xi_n - g(\xi_n)\xi_n^2 - \log\sigma(\xi_n)$$

$$\tilde{G}_1(w_o, \xi_n) := \left(\frac{1}{2} - y_n\right)x_n^{o^T} w_o + g(\xi_n)(x_n^{o^T} w_o)^2$$

$$\tilde{G}_2(w_o, w_h, \xi_n) := \left(\frac{1}{2} - y_n\right)\mu(x_n^o)^T w_h +$$

$$2g(\xi_n)x_n^{o^T} w_o \mu(x_n^o)^T w_h + g(\xi_n)\left((\mu(x_n^o)^T w_h)^2 + w_h^T \Lambda^{-1} w_h\right)$$

where $c$ is a positive real number.

The classifier can be obtained as a point that minimizes the generalization error G. To minimize the generalization error G, the quasi-Newton method can be applied similarly to the case in the above-described learning of a correlation between features. The following expression (21) represents information on differential of the generalization error G. The information is needed in application of the quasi-Newton method.

$$\frac{\partial \tilde{G}}{\partial w_o} = \sum_n \tilde{\tau}(x_n^o)\left(\left(\frac{1}{2} - y_n\right)x_n^o + 2g(\xi_n)\mu(x_n^o)^T w_h x_n^o + 2g(\xi_n)x_n^o x_n^{o^T} w_o\right) + c w_o \quad (21)$$

$$\frac{\partial \tilde{G}}{\partial w_h} = \sum_n \tilde{\tau}(x_n^o)\left(\left(\frac{1}{2} - y_n\right)\mu(x_n^o) + 2g(\xi_n)x_n^{o^T} w_o \mu(x_n^o) + 2g(\xi_n)(\mu(x_n^o)\mu(x_n^o)^T + \Lambda^{-1})w_h\right) + c w_h$$

$$\frac{\partial \tilde{G}}{\partial \xi_n} = \sum_n \tilde{\tau}(x_n^o)\left(\left(\sigma(\xi_n) - \frac{1}{2}\right) - \frac{dg(\xi_n)}{d\xi_n}\xi_n^2 - 2g(\xi_n)\xi_n + \frac{dg(\xi_n)}{d\xi_n}\right.$$

$$\left.\left[(x_n^{o^T} w_o)^2 + 2x_n^{o^T} w_o \mu(x_n^o)^T w_h + (\mu(x_n^o)^T w_h) + w_h^T \Lambda^{-1} w_h\right]\right)$$

where $$\frac{dg(\xi_n)}{d\xi_n} = \frac{1}{2}\frac{\sigma(\xi_n)(1-\sigma(\xi_n))\xi_n - \sigma(\xi_n) + \frac{1}{2}}{(\xi_n)^2}$$

Classifying Unit

FIG. 1 will be described back again. The classifying unit 20 includes a data input unit 21, a data conversion unit 22, a classifying unit 23, and a classification result output unit 24. As described above, the classifying unit 20 performs classifying processing of classifying a sample with the classifier created by the creating unit 10 and outputting a label.

The data input unit 21 is implemented by an input device such as a keyboard and a mouse. The data input unit 21 inputs various pieces of instruction information to a control unit in response to an input operation by an operator, and receives a sample to be classified. The data input unit 21 may be the same hardware as the learning data input unit 11.

The control unit is implemented by, for example, a CPU that executes a processing program, and functions as the data conversion unit 22 and the classifying unit 23.

The data conversion unit 22 converts the sample to be classified received by the data input unit 21 into a feature vector similarly to the data conversion unit 12 of the creating unit 10.

The classifying unit 23 classifies the sample to be classified with reference to the classifier storage unit 16. For example, when logistic regression is applied to a model of the classifier as described above, the probability that the label of the sample indicates 1 can be obtained by the above expression (18). When the obtained probability is equal to or larger than a predetermined threshold value set in advance, the classifying unit 23 determines that the label=1, and, when the obtained probability is smaller than the threshold value, determines that the label=0.

The classification result output unit 24 is implemented, for example, by a display device such as a liquid crystal display, a printing device such as a printer, and an information communication device. The classification result output unit 24 outputs a result of classifying processing to an operator. For example, the classification result output unit 24 outputs a label before conversion to a numerical value for the input sample, gives the label before conversion to the numerical value to the input sample, and outputs the resulting sample.

Creating Processing

Figure 6:
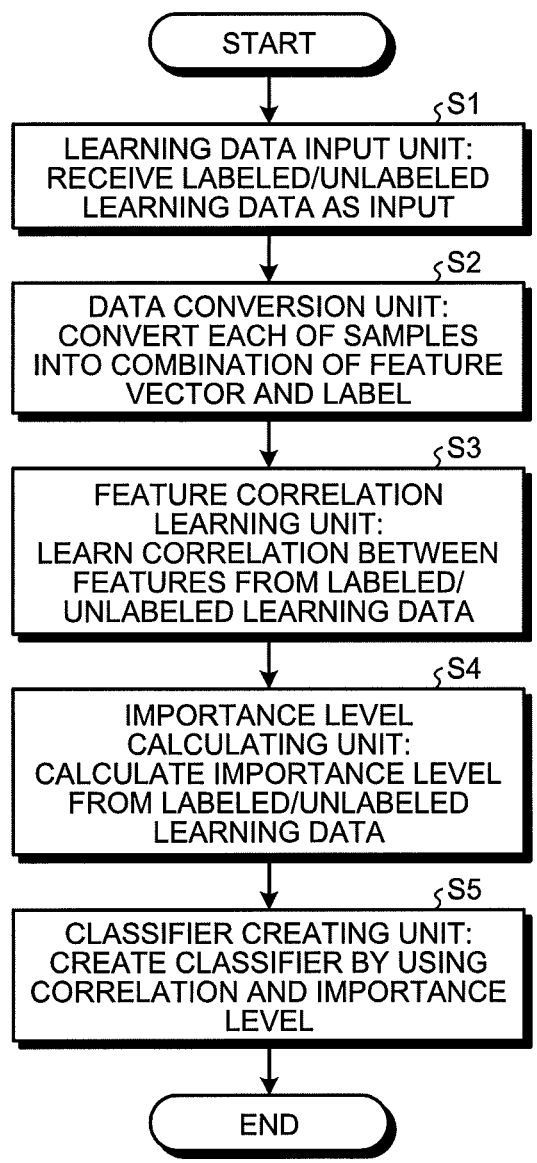
FIG. 6 is a flowchart illustrating a creating processing procedure in the first embodiment.

Creating processing with the creating unit 10 of the creating device 1 will now be described with reference to FIG. 6. The flowchart of FIG. 6 starts, for example, at a timing when a user gives an operation input requesting a start of creating processing.

First, the learning data input unit 11 receives, for example, labeled learning data collected by a certain time and unlabeled learning data collected after the labeled learning data (Step S1). Then, the data conversion unit 12 converts each of samples of the received labeled learning data and unlabeled learning data into combined data of a feature vector and a numerical label (Step S2).

Then, the feature correlation learning unit 13 learns a correlation between a feature appearing also in the sample of the labeled learning data and a feature appearing only in the unlabeled learning data by using the unlabeled learning data (Step S3).

Then, the importance level calculating unit 14 calculates the importance level of the sample of the labeled learning data (Step S4).

Then, the classifier creating unit 15 expands the feature of the sample of the labeled learning data by using the correlation between the features, and creates a classifier by using the labeled learning data whose feature is expanded and the importance level (Step S5). The classifier creating unit 15 also stores the created classifier in the classifier storage unit 16.

Classifying Processing

Figure 7:
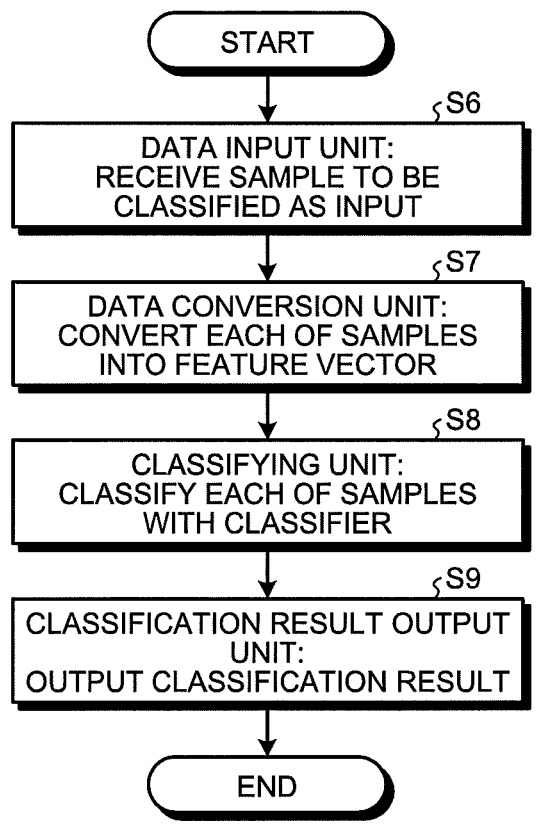
FIG. 7 is a flowchart illustrating the classifying processing procedure in the first embodiment.

Classifying processing with the classifying unit 20 of the creating device 1 will now be described with reference to FIG. 7. The flowchart of FIG. 7 starts, for example, at a timing when a user gives an operation input requesting a start of classifying processing.

First, the data input unit 21 receives a sample to be classified at the current time (step S6), and the data conversion unit 22 converts the received sample into a feature vector (Step S7).

Then, the classifying unit 23 classifies the sample with the stored classifier with reference to the classifier storage unit 16 (Step S8). Then, the classification result output unit 24 outputs a classification result, that is, outputs a label for the classified sample (Step S9).

As described above, in the creating device 1 of the embodiment, the feature correlation learning unit 13 learns a correlation between feature of a sample of labeled learning data and a feature appearing only in a sample of unlabeled learning data. In addition, the importance level calculating unit 14 calculates the importance level indicating an influence level of a sample of labeled learning data on creation of the classifier. Furthermore, the classifier creating unit 15 adds the feature appearing only in the unlabeled learning data to the feature of the sample of the labeled learning data by using the correlation. Then, the classifier creating unit 15 creates a classifier that outputs a label associated with an input sample by using the labeled learning data whose feature is expanded by adding the feature appearing only in the unlabeled learning data and the importance level.

In this way, the creating processing with the creating unit 10 in the creating device 1 of the embodiment can adapt a generation distribution and a feature of a sample of labeled learning data collected by, for example, a certain time to a generation distribution and a feature of a sample of new unlabeled learning data collected after the labeled learning data. A classifier whose classification accuracy is maintained while holding latest classification criteria can be created in consideration of temporal changes in a generation distribution of a sample and a new feature that has not appeared in learning data by creating the classifier with the labeled learning data.

Note that the classifier creating unit 15 sets a condition that the above expression (6) should hold in association with the relation between the probability that a sample of labeled learning data occurs and the probability that a sample of unlabeled learning data occurs. After satisfying the condition, the classifier creating unit 15 creates a classifier that outputs a label associated with an input sample by using the labeled learning data to which a feature appearing only in the unlabeled learning data is added and an importance level. This enables a new feature that does not appear in the labeled learning data and the importance level to be simultaneously addressed.

In addition, creating processing of the invention is not limited to a classification problem where a label is defined as a discrete value in, for example, a class. For example, the creating processing of the invention may be applied to a regression problem where a label is defined as a real value. Alternatively, the creating processing of the invention may be applied to a ranking problem where a label is defined as an order. Alternatively, the creating processing of the invention may be applied to a structure learning problem where a label is defined as structure data. This can hold various classification criteria of a classifier in the latest state.

Second Embodiment

Although the classifier creating unit 15 of the above first embodiment creates a classifier by using a learned correlation between features, a classifier may be created by using a portion that satisfies a predetermined condition, among the learned correlation between the features. The embodiment is different from the above first embodiment in part of processing with the classifier creating unit 15. The rest is the same as the first embodiment, and thus the description will be omitted.

A classifier creating unit 15 of the embodiment adds a feature appearing only in an unlabeled sample to a labeled sample by using an average $\mu^h(x^o)$ of learned correlation between features as one example of partial information that satisfies a predetermined condition among the learned correlation. In this case, the generalization error G expressed in the above expression (7) can be approximated as in the following expression (22).

$$\frac{1}{N}\sum_n \tau(x_n^o)\mathrm{loss}(y_n, Cls(x_n^o, \mu^h(x_n^o))) \tag{22}$$

The classifier can be obtained as a point that minimizes the generalization error G in the above expression (22). To minimize the generalization error G, the quasi-Newton method can be applied similarly to the above-described case in the first embodiment.

Creating processing with a creating unit 10 of a creating device 1 of the embodiment will now be described with reference to FIG. 8. FIG. 8 is a flowchart illustrating a creating processing procedure of the embodiment. Only the processing of Step S51 is different from that in the above first embodiment.

In the processing of Step S51, the classifier creating unit 15 expands a feature by adding a feature appearing only in an unlabeled sample to a labeled sample by using a part of the learned correlation between the features, and creates the classifier by using the labeled learning data whose feature is expanded, and an importance level.

In this way, the creating processing of the creating unit 10 of the creating device 1 in the embodiment creates the classifier by using a part of the learned correlation between the features. This shortens a time period taken to create the classifier.

Program

A program in which processing to be executed by the creating device 1 according to the above embodiment is described in a computer-executable language can be created. In one embodiment, the creating device 1 can be implemented by installing a creating program for executing the above-described creating processing as package software or online software in a desired computer. For example, causing an information processor to execute the above-described creating program enables the information processor to function as the creating device 1. This information processor includes desktop or notebook personal computers. Besides, the information processor also includes, in the category thereof, mobile communication terminals such as smartphones, mobile phones, and personal handyphone systems (PHSs), and slate terminals such as personal digital assistants (PDAs). In addition, the creating device 1 can be implemented as a server device. A terminal device used by a user is defined as a client, and the server device provides services related to the above-described creating processing to the client. For example, the creating device 1 is implemented as a server device that provides creating processing services. In the creating processing service, labeled learning data and unlabeled learning data are input, and a classifier is output. In this case, the creating device 1 may be implemented as a web server, or may be implemented as a cloud that provides services related to the above-described creating processing by outsourcing. One example of a computer that executes a creating program for implementing a function similar to that of the creating device 1 will now be described.

As illustrated in FIG. 9, a computer 1000 for executing a creating program includes, for example, a memory 1010, a CPU 1020, a hard disk drive interface 1030, a disk drive interface 1040, a serial port interface 1050, a video adapter 1060, and a network interface 1070. A bus 1080 connects these units.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A removable storage medium such as a magnetic disk and an optical disk is inserted into the disk drive 1041. For example, a mouse 1051 and a keyboard 1052 are connected to the serial port interface 1050. For example, a display 1061 is connected to the video adapter 1060.

Here, as illustrated in FIG. 9, the hard disk drive 1031 stores, for example, an OS 1091, an application program 1092, a program module 1093, and program data 1094. Each table described in the above embodiment is stored, for example, in the hard disk drive 1031 or the memory 1010.

In addition, the creating program is stored in the hard disk drive 1031 as, for example, the program module 1093 in which a command to be executed by the computer 1000 is described. Specifically, the program module 1093, in which each of the processes to be executed by the creating device 1 described in the above embodiment is written, is stored in the hard disk drive 1031.

In addition, data to be used for information processing by the creating program is stored, for example, in the hard disk drive 1031 as the program data 1094. Then, the CPU 1020 reads the program module 1093 or the program data 1094 stored in the hard disk drive 1031 into the RAM 1012 as necessary, and executes each of the above-described procedures.

Note that the program module 1093 and the program data 1094 relating to the creating program are not limited to being stored in the hard disk drive 1031, and, for example, may be stored in a removable storage medium and read by the CPU 1020 via, for example, the disk drive 1041. Alternatively, the program module 1093 and the program data 1094 relating to the creating program may be stored in another computer connected via a network such as a local area network (LAN) or a wide area network (WAN), and read by the CPU 1020 via the network interface 1070.

Although the embodiments to which the invention made by the inventors is applied have been described above, the invention is not limited by description and drawings which form a part of the disclosure of the invention by the embodiments. That is, for example, all other embodiments, examples, and operation techniques made by those skilled in the art based on the embodiments are included in the scope of the invention.

REFERENCE SIGNS LIST 1 creating device
10 creating unit
11 learning data input unit
12 data conversion unit
13 feature correlation learning unit
14 importance level calculating unit
15 classifier creating unit
16 classifier storage unit
20 classifying unit
21 data input unit
22 data conversion unit
23 classifying unit
24 classification result output unit

The invention claimed is:

1. A creating device for creating a classifier that outputs a label representing an attribute of a sample, comprising:
a memory; and
a processor coupled to the memory and programmed to execute a process comprising:
learning a correlation between a feature of a labeled sample to which the label is given, and a feature appearing only in an unlabeled sample to which the label is not given;
adding the feature appearing only in the unlabeled sample to the feature of the labeled sample by using the correlation, and creating the classifier that outputs the label associated with an input sample by using the labeled sample to which the feature appearing only in the unlabeled sample is added; and
calculating an importance level indicating an influence level of the labeled sample on creation of the classifier, wherein the creating creates the classifier that outputs the label associated with the input sample by using the labeled sample to which the feature appearing only in the unlabeled sample is added and the importance level, wherein the importance level is a value obtained by dividing a test distribution by a training distribution.

2. The creating device according to claim 1, wherein the creating sets a predetermined condition in association with a relation between a probability that the labeled sample occurs and a probability that the unlabeled sample occurs, and after satisfying the condition, creates the classifier that outputs the label associated with the input sample by using the labeled sample to which the feature appearing only in the unlabeled sample is added and the importance level.

3. The creating device according to claim 1, wherein the adding adds the feature appearing only in the unlabeled sample to the labeled sample by using partial information that satisfies a predetermined condition among the learned correlation.

4. The creating device according to claim 3, wherein the adding adds the feature appearing only in the unlabeled sample to the labeled sample by using an average value of the learned correlation.

5. A non-transitory computer-readable recording medium having stored a creating program that causes a computer to execute:
   a learning step of learning a correlation between a feature of a labeled sample to which a label representing an attribute of the sample is given, and a feature appearing only in an unlabeled sample to which the label is not given;
   a creating step of adding the feature appearing only in the unlabeled sample to the feature of the labeled sample by using the correlation, and creating a classifier that outputs the label associated with an input sample by using the labeled sample to which the feature appearing only in the unlabeled sample is added; and
   calculating an importance level indicating an influence level of the labeled sample on creation of the classifier,
   wherein the creating creates the classifier that outputs the label associated with the input sample by using the labeled sample to which the feature appearing only in the unlabeled sample is added and the importance level,
   wherein the importance level is a value obtained by dividing a test distribution by a training distribution.

6. A creating method to be performed in a creating device for creating a classifier that outputs a label representing an attribute of a sample, comprising:
   a learning process of learning a correlation between a feature of a labeled sample to which the label is given, and a feature appearing only in an unlabeled sample to which the label is not given;
   a creating process of adding the feature appearing only in the unlabeled sample to the feature of the labeled sample by using the correlation, and creating the classifier that outputs the label associated with an input sample by using the labeled sample to which the feature appearing only in the unlabeled sample is added; and
   calculating an importance level indicating an influence level of the labeled sample on creation of the classifier,
   wherein the creating creates the classifier that outputs the label associated with the input sample by using the labeled sample to which the feature appearing only in the unlabeled sample is added and the importance level,
   wherein the importance level is a value obtained by dividing a test distribution by a training distribution.

* * * * *